United States Patent [19]

Yamamoto et al.

[11] Patent Number: 5,284,917
[45] Date of Patent: Feb. 8, 1994

[54] THERMOPLASTIC RESIN COMPOSITION

[75] Inventors: Naoki Yamamoto; Hiroshi Mori; Masaharu Fujimoto, all of Otake, Japan

[73] Assignee: Mitsubishi Rayon Co., Ltd., Tokyo, Japan

[21] Appl. No.: 720,490

[22] PCT Filed: Nov. 22, 1990

[86] PCT No.: PCT/JP90/01525
   § 371 Date: Jul. 5, 1991
   § 102(e) Date: Jul. 5, 1991

[87] PCT Pub. No.: WO91/08261
   PCT Pub. Date: Jun. 13, 1991

[30] Foreign Application Priority Data

Nov. 24, 1989 [JP] Japan ................... 1-305754
Nov. 24, 1989 [JP] Japan ................... 1-305755

[51] Int. Cl.$^5$ .................. C08L 63/00; C08F 8/00
[52] U.S. Cl. ........................ 525/113; 525/111; 525/117; 525/123; 525/131; 525/166; 525/510; 525/511
[58] Field of Search ............ 525/113, 510, 511, 123, 525/166, 117, 111, 131

[56] References Cited

U.S. PATENT DOCUMENTS

| | | |
|---|---|---|
| 4,727,117 | 2/1988 | Hallden-Abberton et al. ............... 525/327.4 |
| 4,761,457 | 8/1988 | Arita et al. ................ 525/439 |
| 4,762,883 | 8/1988 | Goel ........................... 525/113 |
| 4,874,800 | 10/1989 | Minamisawa et al. ........ 524/538 |
| 4,877,848 | 10/1989 | Maresca ..................... 525/433 |
| 4,954,574 | 9/1990 | Hallden-Abberton et al. . |
| 4,981,892 | 1/1991 | Nishida et al. ............. 524/291 |
| 5,004,777 | 4/1991 | Hallden-Abberton et al. . |
| 5,008,347 | 4/1991 | Thill et al. .................. 525/433 |

FOREIGN PATENT DOCUMENTS

| | | |
|---|---|---|
| 0241352 | of 0000 | Japan . |
| 0243248 | of 0000 | Japan . |
| 02127455 | of 0000 | Japan . |
| 58-208348 | 12/1983 | Japan . |
| 59-25836 | 2/1984 | Japan . |
| 59-41355 | 3/1984 | Japan . |
| 61-89255 | 4/1986 | Japan . |
| 62-25148 | 2/1987 | Japan . |

*Primary Examiner*—John C. Bleutge
*Assistant Examiner*—Randy Gulakowski
*Attorney, Agent, or Firm*—Oblon, Spivak, McClelland, Maier & Neustadt

[57] ABSTRACT

Disclosed is a thermoplastic resin composition having excellent moldability and thermal resistance which comprises (A) a methacrylimide-containing polymer having at least 10% by weight of units represented by the general formula

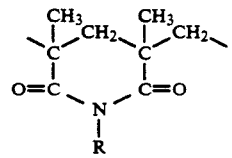

where R is a hydrogen atom or an aliphatic, aromatic or alicyclic hydrocarbon radical having 1 to 20 carbon atoms, (B) at least one thermoplastic polymer selected from the group consisting of a thermoplastic polyester (B-1) and a thermoplastic polyamide (B-2), and (C) at least one multifunctional compound selected from the group consisting of a multifunctional epoxy compound, a multifunctional oxazoline compound and a multifunctional isocyanate compound.

5 Claims, No Drawings

THERMOPLASTIC RESIN COMPOSITION

DESCRIPTION

1. Technical Field

This invention relates to thermoplastic resin compositions having excellent moldability and thermal resistance.

2. Background Art

It is disclosed in Japanese Patent Laid-Open No. 41355/'84 that mixtures of a methacrylimide-containing polymer and a thermoplastic polyester provide resin compositions having high thermal resistance, as well as excellent mechanical strength and melt flow properties. Moreover, it is disclosed in Japanese Patent Laid-Open Nos. 25836/'84 and 208348/'83 that mixtures of a methacrylimide-containing polymer and a polyamide provide resin compositions having low molding shrinkage and high toughness.

However, resin compositions formed simply by blending a methacrylimide-containing polymer with a thermoplastic polyester or polyamide tend to produce sink marks and flash during melt molding and are hence disadvantageous from the viewpoint of moldability.

DISCLOSURE OF THE INVENTION

It is an object of the present invention to provide a resin composition consisting essentially of a methacrylimide-containing polymer and at least one of a thermoplastic polyester and a thermoplastic polyamide and exhibiting improved moldability.

According to the present invention, there is provided a thermoplastic resin composition comprising (A) 1 to 99 parts by weight of a methacrylimide-containing polymer having at least 10% by weight of methacrylimide units represented by the general formula

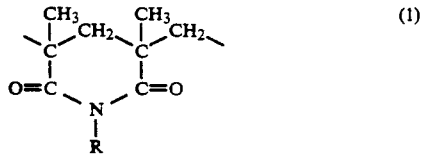

where R is a hydrogen atom or an aliphatic, aromatic or alicyclic hydrocarbon radical having 1 to 20 carbon atoms, (B) 99 to 1 part by weight of at least one thermoplastic polymer selected from the group consisting of a thermoplastic polyester (B-1) and a thermoplastic polyamide (B-2), the combined amount of components (A) and (B) being 100 parts by weight, and (C) 0.05 to 10 parts by weight of at least one multifunctional compound selected from the group consisting of a multifunctional epoxy compound, a multifunctional oxazoline compound and a multifunctional isocyanate compound.

BEST MODE FOR CARRYING OUT THE INVENTION

The methacrylimide-containing polymer (A) used in the present invention is a polymer or copolymer containing cyclic imide units represented by the above general formula (1). Methacrylimide-containing polymers having any chemical structure can be used, provided that they contain not less than 10% by weight of cyclic imide units as described above. However, methacrylimide-containing polymers in which R is hydrogen, methyl, ethyl, propyl, butyl or phenyl are usually used.

No particular limitation is placed on the method of preparing the methacrylimide-containing polymers. By way of example, one useful process comprises dissolving polymethyl methacrylate and ammonia or a primary amine (such as methylamine or ethylamine) in a suitable solvent (selected, for example, from aromatic hydrocarbons such as benzene, toluene, xylene and ethylbenzene; alcohols such as methanol, ethanol and propanol; and mixtures of two or more these solvents), and heating the reaction mixture in an autoclave at 170°–350° C. to form imide rings. Alternatively, the reaction may be carried out in an extruder as described in Japanese Patent Laid-Open No. 63989/'77.

It is necessary that the cyclic imide units represented by the above general formula (1) be contained in an amount of at least 10% by weight based on total weight of the polymer. If the amount is less than 10% by weight, the methacrylimide-containing polymer will fail to exhibit its inherent thermal resistance.

In the resin compositions of the present invention, the methacrylimide-containing polymer is used in an amount of 1 to 99 parts by weight, preferably 5 to 95 parts by weight, per 100 parts by weight of the mixture of components (A) and (B).

The thermoplastic polyester (B-1) used in the present invention is a polyester formed by the polycondensation of at least one aromatic dicarboxylic acid component selected from the group consisting of terephthalic acid, 2,6-naphthalenedicarboxylic acid and isophthalic acid, with at least one diol component selected from the group consisting of alkylene glycols (such as ethylene glycol, propylene glycol, butylene glycol and hexylene glycol) and polyalkylene glycols (such as polyethylene glycol and polytetramethylene glycol). Specific examples thereof include homopolyesters such as polyethylene terephthalate (PET), polypropylene terephthalate (PPT), polybutylene terephthalate (PBT), polyhexylene terephthalate (PHT), polyethylene naphthalate (PEN) and polybutylene naphthalate (PBN), as well as copolyesters such as polyethylene terephthalate isophthalate (PET/I) and polybutylene terephthalate isophthalate (PBT/I). These thermoplastic polyesters can further contain 30 mole % or less of other copolymerizable components including dicarboxylic acids such as adipic acid, sebacic acid, dodecanedicarboxylic acid, hexadecanedicarboxylic acid, octadecanedicarboxylic acid, dimer acids, phthalic acid, 4,4'-diphenyldicarboxylic acid and sulfoisophthalic acid, and diols such as the addition product of ethylene oxide with bisphenol A.

Preferably, the thermoplastic polyester used in the present invention are ones in which 70 mole % or more of the acid components constituting the polyester are selected from the group consisting of terephthalic acid, 2,6-naphthalenedicarboxylic acid, isophthalic acid and esterified derivatives thereof.

No particular limitation is placed on the degree of polymerization of the thermoplastic polyester used in the present invention. However, it is preferable to use a thermoplastic polyester having an intrinsic viscosity, $[\eta]$, of 0.4 to 1.5 as measured at 25° C. in a mixture of phenol and tertachloroethane (weight ratio 1:1).

The thermoplastic polyamide (B-2) used in the present invention is a polyamide selected from the group consisting of polyamides formed by the ring opening polymerization of lactams such as ε-caprolactam and ω-dodecalactam; polyamides formed from amino acids such as 6-aminocaproic acid, 11-aminoundecanoic acid and 12-aminododecanoic acid; polyamides formed from an aliphatic, alicyclic or aromatic diamine (such as ethylenediamine, hexamethylenediamine, undecamethylenediamine, dodecamethylenediamine, 2,2,4- or 2,4,4-trimethylhexamethylenediamine, 1,3- or 1,4-bis-(aminomethyl)cyclohexane, bis(4,4'-aminocyclohexyl)methane, or m- or p-phenylenediamine) and an aliphatic, alicyclic or aromatic dicarboxylic acid (such as adipic acid, suberic acid, sebacic acid, dodecanedicarboxylic acid, 1,3- or 1,4-cyclohexnedicarboxylic acid, isophthalic acid, terephthalic acid or dimer acid); and copolyamides and mixed polyamides formed from the foregoing components. Among these polyamides, polycapramide (nylon 6), polyundecanamide (nylon 11), polydodecanamide (nylon 12), polyhexamethyleneadipamide (nylon 66) and copolyamides composed chiefly of the foregoing polyamides are especially useful. These polyamides can usually be prepared according to the well-known melt polymerization technique, solid phase polymerization technique, or a combination thereof. Although no particular limitation is placed on the degree of polymerization of the polyamides, it is preferable to use polyamides having a relative viscosity of 2.5 to 5.0 as measured at 25° C. with a solution of 1 g of the polymer in 100 ml of 98% concentrated sulfur acid.

In the resin compositions of the present invention, at least one of the above-described thermoplastic polyester (B-1) and the above-described thermoplastic polyamide (B-2) is used in an amount of 1 to 99 parts by weight, preferably 5 to 95 parts by weight, per 100 parts by weight of the mixture of components (A) and (B).

In addition, at least one multifunctional compound (C) selected from the group consisting of a multifunctional epoxy compound, a multifunctional oxazoline compound and a multifunctional isocyanate compound is also used in the present invention.

The multifunctional epoxy compound used in the present invention is a compound having two or more epoxy groups. Examples thereof include bisphenol type epoxy compounds such as bisphenol A diglycidyl ether and halogenated bisphenol A diglycidyl ether; phenol type epoxy compounds such as alkylphenol diglycidyl ethers and phenolphthalein epoxide; glycol type epoxy compounds such as polyethylene glycol triglycidyl ether and glycerol triglycidyl ether; ester type epoxy compounds such as diglycidyl phthalate; glycidylamine type compounds such as N,N'-diglycidylaniline; and other epoxy compounds such as triglycidyl isocyanurate.

The multifunctional oxazoline compound used in the present invention is a compound having two or more oxazoline groups. Examples thereof include 2,2'-(1,3-phenylene)bis(2-oxazoline) and 2,2'-(1,4-phenylene)-bis(2-oxazoline).

The multifunctional isocyanate compound used in the present invention is a compound having two or more isocyanate groups. Examples thereof include toluylene diisocyanate, diphenylmethane diisocyanate, diphenylene diisocyanate, triphenylmethane triisocyanate, hexamethylene diisocyanate and naphthalene diisocyanate.

The above-defined multifunctional compounds (C) is used in an amount of 0.05 to 10 parts by weight, preferably 0.1 to 3 parts by weight, per 100 parts by weight of the combined amount of the methacrylimide-containing polymer (A) and the thermoplastic polymer (B). The above-enumerated multifunctional compounds can also be used in admixture of two or more. If the amount of multifunctional compound (C) used is less than 0.05 part by weight, the resulting resin composition will not be sufficiently effective in improving moldability. If it is greater than 10 parts by weight, the resulting resin composition will have poor fluidity.

Moreover, the multifunctional compound (C) should preferably have a molecular weight of 5,000 or less so that it may be uniformly dispersed and reacted in the resin composition.

In order to improve their thermal resistance, light resistance and resistance to oxidative degradation, thermal decomposition inhibitors and ultraviolet light absorbers may be added to the resin compositions of the present invention. Moreover, plasticizers, pigments, lubricants and the like may also be incorporated therein. Furthermore, fibrous fillers such as glass fibers and carbon fibers may also be added thereto for reinforcing purposes.

The present invention is more specifically explained with reference to the following examples.

(1) Measurement of heat distortion temperature and Izod impact strength

Heat distortion temperature was measured according to ASTM D 648-56 (under a load of 18.56 kg/cm$^2$), and Izod impact strength was measured according to ASTM D 256-26, Method A.

(2) Determination of the degree of imidization (%) of the methacrylimide-containing polymer (A)

The nitrogen content of the polymer (A) was determined by elemental analysis using an MT-3 CHN Recorder (manufactured by Yanagimoto Seisakusho). Moreover, using a JNM-FX-100 Sepctrometer (manufactured by JEOL), its proton NMR spectrum was recorded at a frequency of 100 MHz. It was assumed that the methacrylimide-containing polymer (A) had a repeated structure composed of methacrylimide ring units and methyl methacrylate units as represented by the general formula

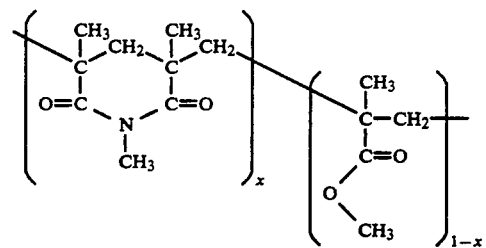

On this assumption, the value of x was determined and converted to a percentage, which was regarded as its degree of imidization. The value of x was determined from the nitrogen content obtained by elemental analysis and from the integral ratio of the methyl absorption of >N—CH$_3$ to the methyl absorption of —O—CH$_3$ in the proton NMR spectrum.

(3) Determination of the intrinsic viscosity of a methyl methacrylate polymer Using a Deereax-Bischoff viscometer, the flowing time ($t_s$) of a 0.5 wt. % solution of a sample polymer in chloroform and the flowing time ($t_o$) of chloroform were measured at 25°±0.1° C. After the relative viscosity, $\eta_{rel}$, of the polymer was obtained from the value of $t_s/t_o$, the intrinsic viscosity thereof was calculated according to the following equation:

$$\text{Intrinsic viscosity} = \lim_{c \to 0} (\ln \eta_{rel})/C$$

where C is the concentration (in g/100 ml) of the polymer.

SYNTHESIS EXAMPLE

A 1.5-liter reactor fitted with a paddle spiral agitator, a pressure gauge, a sample pouring vessel and a jacket heater was charged with 100 parts by weight of a methyl methacrylate polymer (PMMA) having an intrinsic viscosity of 0.51, 80 parts by weight of toluene, and 20 parts by weight of methanol. This mixture was heated to 250° C. and stirred until the polymer was completely dissolved. After the addition of 21.7 parts by weight of methylamine (in a molar ratio of 0.7 based on the methyl methacrylate units in PMMA), the resulting mixture was heated under an internal pressure of 60 kg/cm²G for 3 hours. After completion of the reaction, a methacrylimide-containing polymer (A-1) was recovered and dried to obtain a sample powder. This powder (A-1) had a degree of imidization of 70%.

EXAMPLES 1-8 AND COMPARATIVE EXAMPLES 1-3

The methacrylimide-containing polymer (A-1) prepared in the foregoing Synthesis Example, and a polyethylene terephthalate ($[\eta]=0.72$) or a polybutylene terephthalate ($[\eta]=0.83$) were blended with each of the multifunctional compounds shown in Table 1. The resulting blend was pelletized at 290° C. by means of an extruder having a bore diameter of 40 mm. Then, using an inline screw type injection molding machine having a bore diameter of 36 mm, these pellets were molded at a cylinder temperature of 280° C. and a mold temperature of 70° C. of form test pieces measureing 6.4 mm (thickenss) ×12.8 mm (width)×128 mm (length). More specifically, after the short shot pressure was determined, test pieces were molded at the short shot pressure plus 150 kg/cm², held at the short shot pressure plus 120 kg/cm² for 7 seconds, cooled for 30 seconds, and then removed from the mold.

The thickness of each of the test pieces so formed was measured at five locations, and the minimum value was used as an indication of molding shrinkage.

The results thus obtained are shown in Table 1. It can be seen from these results that molding shrinkage is improved by the addition of specific multifunctional compounds.

TABLE 1

|  | Example 1 | Example 2 | Example 3 | Comparative Example 1 | Comparative Example 2 | Example 4 | Example 5 | Example 6 | Comparative Example 3 | Example 7 | Example 8 |
|---|---|---|---|---|---|---|---|---|---|---|---|
| Methacrylimide-containing polymer (A-1) (parts by weight) | 50 | 80 | 20 | 50 | 20 | 50 | 50 | 50 | 50 | 50 | 50 |
| Thermoplastic polyester*¹ | PET | PET | PET | PET | PET | PET | PET | PET | PET | PBT | PBT |
| (parts by weight) | 50 | 20 | 80 | 50 | 80 | 50 | 50 | 50 | 50 | 50 | 50 |
| Multifunctional compound*² | TGI | TGI | TGI | — | — | PBO | DPMI | PBO | PBO | TGI | PBO |
| (parts by weight) | 0.3 | 0.3 | 0.3 |  |  | 0.4 | 0.3 | 3 | 15 | 0.3 | 0.3 |
| Minimum thickness of test piece (mm) | 6.2 | 6.2 | 6.0 | 5.4 | 5.1 | 6.2 | 6.2 | 6.3 | Too high melt viscosity for extrusion | 6.2 | 6.1 |
| H.D.T.*³ (°C.) | 110 | 122 | 80 | 113 | 83 | 112 | 113 | 110 |  | 110 | 110 |

*¹PET = polyethylene terephthalate. PBT = polybutylene terephthalate.
*²TGI = triglycidyl isocyanurate. PBO = 2,2-(1,3-phenylene)bis(2-oxazoline). DPMI = diphenylmethane diisocyanate.
*³Heat distortion temperature.

EXAMPLES 9-17 AND COMPARATIVE EXAMPLES 4-8

The methacrylimide-containing polymer (A-1) prepared in the foregoing Synthesis Example, and nylon 66 (commercially available under the trade name of 2020B from Ube Kosan K.K.), nylon 6 (commercially available under the trade name of Novamide 1010 from Mitsubishi Chemical Industries Co., Ltd.) or nylon 12 (commercially available under the trade name of Glylamide L20G from Mitsubishi Chemical Industries Co., Ltd.) were blended with each of the multifunctional compounds shown in Table 2. The resulting blend was pelletized in the same manner as described in Example 1. Using these pellets, test pieces were molded in the same manner as described in Example 1, and the thickness of each test piece was measured to evaluate the degree of molding shrinkage.

The results thus obtained are shown in Table 2. It can be seen from these results that, also in the case of resin compositions comprising a methacrylimide-containing polymer and a thermoplastic polyamide, molding shrinkage is improved by the addition of specific multifunctional compounds.

TABLE 2

| | Example | | | Comparative Example | | Example | | | |
|---|---|---|---|---|---|---|---|---|---|
| Example No. | 9 | 10 | 11 | 4 | 5 | 12 | 13 | 14 | 15 |
| Methacrylimide-containing polymer (A-1) (parts by weight) | 50 | 80 | 20 | 50 | 20 | 50 | 50 | 50 | 50 |
| Thermoplastic polyamide*¹ | NY66 | NY66 | NY66 | NY66 | NY66 | NY66 | NY66 | NY66 | NY66 |
| (parts by weight) | 50 | 20 | 80 | 50 | 80 | 80 | 50 | 50 | 50 |
| Multifunctional compound*² | PBO | PBO | PBO | — | — | TGI | DPMI | HMD | PBO |
| (parts by weight) | 0.3 | 0.3 | 0.3 |  |  | 0.2 | 0.2 | 0.5 | 3 |

TABLE 2-continued

| | | | | | | | | | |
|---|---|---|---|---|---|---|---|---|---|
| Minimum thickness of test piece (mm) | 6.2 | 6.2 | 6.1 | 5.6 | 5.3 | 6.2 | 6.2 | 6.1 | 6.2 |
| H.D.T.*3 (°C.) | 115 | 125 | 85 | 116 | 87 | 114 | 112 | 115 | 113 |

| | Comparative Example | Example | | Comparative Example | |
|---|---|---|---|---|---|
| Example No. | 6 | 16 | 17 | 7 | 8 |
| Methacrylimide-containing polymer (A-1) (parts by weight) | 50 | 50 | 50 | 50 | 50 |
| Thermoplastic polyamide*1 (parts by weight) | NY66 50 | NY6 50 | NY12 50 | NY6 50 | NY12 50 |
| Multifunctional compound*2 (parts by weight) | PBO 15 | TGI 0.3 | TGI 0.3 | — | — |
| Minimum thickness of test piece (mm) | Too high melt viscosity for extrusion | 6.0 | 6.2 | 5.1 | 5.4 |
| H.D.T.*3 (°C.) | | 105 | 100 | 106 | 100 |

*1NY 66 = nylon 66; NY6 = nylon 6; NY12 = nylon 12.
*2PBO = 2,2'-(1,3-phenylene)bis(2-oxazoline); TGI = triglycidyl isocyanurate; DPMI = diphenylmethane diisocyanate; HMD = hexamethylenediamine.
*3Heat distortion temperature.

We claim:

1. A thermoplastic resin composition comprising
(A) 1 to 99 parts by weight of a methacrylimide-containing polymer having at least 10% by weight of methacrylimide units represented by the formula

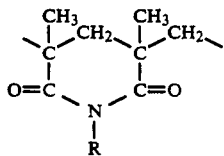

where R is a hydrogen atom or an aliphatic, aromatic or alicyclic hydrocarbon radical having 1 to 20 carbon atoms,
(B) 99 to 1 part by weight of at least one thermoplastic polymer selected from the group consisting of thermoplastic polyester (B-1) and a thermoplastic polyamide (B-2), the combined amount of components (A) and (B) being 100 parts by weight, and
(C) 0.05 to 10 parts by weight of at least one compound selected from the group consisting of polyepoxides, polyoxazolines, polyisocyanates.

2. The thermoplastic resin composition of claim 1 wherein 70 mole % or more of the acid components constituting the thermoplastic polyester (B-1) are selected from the group consisting of terephthalic acid, 2,6-naphthalenedicarboxylic acid, isophthalic acid and esterified derivatives thereof.

3. The thermoplastic resin composition of claim 1 wherein the thermoplastic polyamide (B-2) is selected from the group consisting of polycapramide, polyundecanamide, polydodecanamide, polyhexamethyleneadipamide, and copolyamides composed chiefly of the foregoing amides.

4. The thermoplastic resin composition of claim 1 which comprises 5 to 95 parts by weight of the methacrylimide-containing polymer (A) and 95 to 5 parts by weight of the thermoplastic polymer (B), the combined amount of components (A) and (B) being 100 parts by weight.

5. The thermoplastic resin composition of claim 1 or 4 wherein the compound (C) is used in an amount of 0.1 to 3 parts by weight per 100 parts by weight of the mixture of components (A) and (B).

* * * * *